United States Patent [19]

Chiang

[11] Patent Number: 6,003,049
[45] Date of Patent: Dec. 14, 1999

[54] DATA HANDLING AND TRANSMISSION SYSTEMS EMPLOYING BINARY BIT-PATTERNS BASED ON A SEQUENCE OF STANDARD DECOMPOSED STROKES OF IDEOGRAPHIC CHARACTERS

[76] Inventor: James Chiang, 26288 W. Fremont Rd., Los Altos Hills, Calif. 94022

[21] Appl. No.: 08/799,642

[22] Filed: Feb. 10, 1997

[51] Int. Cl.[6] .............................. G06F 17/20; G06F 3/023
[52] U.S. Cl. ........................................................... 707/535
[58] Field of Search ............................ 707/535; 382/185, 382/186, 187, 188

[56] References Cited

U.S. PATENT DOCUMENTS

| | | | |
|---|---|---|---|
| 2,950,800 | 8/1960 | Caldwell | 400/110 |
| 4,173,753 | 11/1979 | Chou | 382/185 |
| 4,689,743 | 8/1987 | Chiu | 341/20 |
| 4,829,853 | 5/1989 | Monroe et al. | 382/185 |
| 4,872,196 | 10/1989 | Royer et al. | 455/564 |
| 4,876,607 | 10/1989 | Tseng | 345/142 |
| 4,951,202 | 8/1990 | Yan | 707/535 |
| 5,119,296 | 6/1992 | Zheng et al. | 707/535 |
| 5,444,829 | 8/1995 | Kawabata et al. | 707/542 |
| 5,586,185 | 12/1996 | Lakritz | 382/185 |
| 5,774,118 | 6/1998 | Hatakama | 345/337 |
| 5,774,660 | 6/1998 | Brendel et al. | 395/200.31 |
| 5,790,055 | 8/1998 | Yu | 707/535 |

FOREIGN PATENT DOCUMENTS 1068435   1/1993   China .

OTHER PUBLICATIONS

Anonymous, "Seiho Shushuku Robotto–ni Yoru Internet–deno WWW Shozai Kensaku Database Kochiku", Science and Technology Promotion Agency of Japan, report on detabesu construction and technology development, (Japan) pp. 1–98, Oct. 1996.

Anonymous, "Construction od WWW Location Retrieval Database in Internet by Information Collection Robot", translation of Science and Technology Promotion Agency report, (Japan), by Schreiber Translations, Inc (Washington D.C.), pp. 1–33, Sep. 1998.

Ishida, Haruisa, "Chinese Character Input/Output and Transmission in Japanese Personal Computing", Proceedings of IEEE Computer Society International Conference Compcon '79, Wash. D.C., published in New York: IEEE Press, pp. 402–409, Sep. 1979.

Hsu, Joe. "Surf the Internet in a Chinese Environment", published by Lake Forest BBS/Datung Internet, located at ~exo.com/–datung/micro1.html., pp. 1–4, Dec. 1996.

(List continued on next page.)

*Primary Examiner*—Mark R. Powell
*Assistant Examiner*—Jeffrey Allen Rossi
*Attorney, Agent, or Firm*—Bo-In Lin

[57] ABSTRACT

A method for constructing a sequentially arranged machine readable binary code for each of a plurality of ideographic characters adaptable for processes by a data handling and transfer system is disclosed in this invention. The method includes the steps of: (a) defining a plurality of binary bit patterns each representing a standard stroke for composing the plurality of ideographic characters; (b) decomposing each of the plurality of ideographic characters into a sequence of compositional strokes each correspondent to one of the standard strokes according to a stroke sequential order for writing the plurality of ideographic characters; and (c) constructing the machine readable binary code adaptable for processes by the data handling and transfer system by sequentially placing each of the binary bit patterns correspondent to each of the compositional strokes according to the stroke sequential order for writing the plurality of ideographic characters whereby each of the ideographic characters are arranged in a systematic predefined order when represented by the machine readable binary code.

19 Claims, 14 Drawing Sheets

OTHER PUBLICATIONS

Wong, Kim Fai. "Parallel Indexing in a Chinese Computer Software Retrieval System", Proceedings of the Eighteenth International Computer Software and Applications Conference, I.E.E.E. Computer Society Press, pp. 320–325, Nov. 1994.

Wing, Kai Kan et al., "On–demand Multi Lingual Font Service on Heterogeneous Computer Platforms", Web Net 96—World Conference of the Web Society, pp. 243–248, Oct. 1996.

CSIC "Standard Intechange Code for Generally–Used Chinese Characters", National Bureau of Standards, Ministry of Economic Affairs, Taiwan (Biblio. citation only), Jan. 1986.

| Stroke | Writing Direction | Name | Pronounciation 注音 | Pin Yin | Meaning |
|---|---|---|---|---|---|
| 一 | → | 橫 | ㄏㄥˊ | Heng | Across Horizontally to the right |
| ╱ | ↗ | 提 | ㄊㄧˊ | Ti | Up Stroke to the right |
| ╲ | ↘ | 捺 | ㄋㄚˋ | Na | Down stroke to the right |
| ⌐ | ↘→ | 拖 | ㄊㄨㄛ | Tuo | Down then Drag to the right |
| ∣ | ↓ | 直 | ㄓˊ | Zhi | Straight down |
| ﹨ | ↘ | 點 | ㄉㄧㄢˇ | Dian | Point |
| ╱ | ↗ | 千 | ㄑㄧㄢ | Qian | Thousand (The first stroke) |
| ⌡ | ↓↗ | 川 | ㄔㄨㄢ | Chuan | A Mountain Stream (The first stroke) |
| ∠ | ↗→ | 母 | ㄇㄨˇ | Mu | Mother (Ther first stroke) |
| ＜ | ↗↘ | 女 | ㄋㄩˇ | Nyu | Daughter (Ther first stroke) |
| L | ↓→ | 將 | ㄐㄧㄤ | Jiang | General (Ther first stroke) |
| ⌣ | ↓→↑ | 元 | ㄩㄢˊ | Yuan | Marshall (The last stroke) |
| ⌐ | →↗ | 子 | ㄗˇ | Zi | Son (The first stroke) |
| ⌐ | →↗ | 又 | ㄧㄡˋ | You | Also (The first stroke) |
| ⌐ | →↓↘ | 君 | ㄐㄩㄣ | Jun | King (The first stroke) |
| ⌐ | ↓↘ | 小 | ㄒㄧㄠˇ | Xiao | Little (The first stroke) |
| ⌐ | ↘↗↘ | 猊 | ㄋㄧˊ | Ni | Lion (The second stroke) |
| ∟ | ↓↗ | 氏 | ㄕˋ | Shi | Clan (The second stroke) |
| ⌐ | ↘↗ | 成 | ㄔㄥˊ | Cheng | Becoming (The fourth stroke) |
| ⌐ | →↘↗ | 氣 | ㄑㄧˋ | Qi | Overpoweing influence (The fourth stroke) |
| ㄅ | ↗→↗↘ | 兮 | ㄒㄧ | Xi | An interjectional utterance (The last stroke) |

Figure 1

| Strokes | Name | Pronounciation | Meaning |
|---|---|---|---|
| 一乀乚 | 權提搭扡 | Heng Ti Na Tuo | [A person named] Heng Ti Na Tuo |
| 丨丶丿 | 直點千川 | Shi Dian Qian Chuan | [led his forces] straight pointing to [a place named] Thousand Streams. |
| 乙く𠃊𠃋 | 母女將元 | Mu Nyu Jiang Yuan | [His] mother [and] daughter [are] general [and] marshall. |
| 𠃌刁刀 | 子又君 | Zi You Jun | [His] son also [was made] king. |
| 丿㇄匕 | 小猊氏 | Xiao Ni Shi | [The] Little Lion clan |
| 乀𠃋勹 | 成氣令 | Cheng Qi Xi | [is] becoming [an] overpowering influence. See?! |

Figure 2

| | | |
|---|---|---|
| For A := 0 incremented by 2 to 20<br>Begin<br>    B := A+4<br>    C := A*B<br>End | | 從甲：＝０起逐次加２到２０<br>開始<br>    乙：＝甲＋４<br>    丙：＝甲＊乙<br>終止 |
| A program in English | | Same Program in Chinese |

---

| | | |
|---|---|---|
| 從 | ⸝ ⸍ ｜ ⸍ ＼ ⸍ ＼ ｜ — ⸍ ⌣ | 47 47 45 47 43 43 45 41 47 44 20* |
| 甲 | ｜ ㄱ — — ｜ | 45 4F 41 41 45 20 |
| ： | ： | 3A 20 |
| ＝ | ＝ | 3D 20 |
| ０ | ０ | 30 20 |
| 起 | — ｜ — ｜ ⸍ ⌣ ㄱ — ㄴ | 41 45 41 45 41 47 44 4F 41 4C 20 |
| 逐 | — ⸍ ) ⸍ ⸍ ＼ ヽ ) ⌣ | 41 47 51 47 47 47 43 46 51 44 20 |
| 次 | ヽ ╱ ⸍ ㄱ ⸍ ＼ | 46 42 47 4D 47 43 20 |
| 加 | ㄱ ノ ｜ ㄱ — | 4F 48 45 4F 41 20 |
| ２ | ２ | 32 20 |
| 到 | — ∠ ヽ — ｜ — ｜ 亅 | 41 49 46 41 45 41 45 50 20 |
| ２ | ２ | 32 20 |
| ０ | ０ | 30 20 |

* Note: The space character (Hex 20) is being used as the terminating character for each ideogram sequence First line of the Chinese Program decomposed into character strokes and their binary codes

Figure 3

Example of A One-Pass
Chinese Source Program Compiler

The Chinese ideogram stroke sequence applied in the OSI Data communication model The Chinese ideogram stroke sequence used in the protocol and interface formats to transmit information from one computer to another The Chinese ideogram stroke sequence used to build indices for database tables in a Chinese database

工程顧問
工具店
中國餐館
中文學校
家電產品
家具店
倉庫出租
公證服務
俱樂部

Example of a Chinese Web site listing (partial listing) sorted in the stroke sequence order

Figure 7

Example of a
Chinese Stroke Keyboard layout

Example of a Chinese Stroke
Telephone Pad layout

DATA HANDLING AND TRANSMISSION SYSTEMS EMPLOYING BINARY BIT-PATTERNS BASED ON A SEQUENCE OF STANDARD DECOMPOSED STROKES OF IDEOGRAPHIC CHARACTERS

BACKGROUND OF THE INVENTION

1. Field of the Invention

This invention relates generally to apparatus and methods for construction and organization of machine recognizable binary codes employed in data handling and transmitting systems. More particularly, this invention relates to a novel apparatus and method for construction and organization of machine recognizable binary codes based on systematic ordering of a sequence of decomposed stroke elements of the ideographic characters to provide a platform to build a computer and data transmission system derived directly from a language represented by ideographic writing characters.

2. Description of the Prior Art

Due to the large number of individual writing characters and the complexity of graphic representation for each writing character in an ideographic language system, e.g., Chinese, Japanese Kanji, and Korean, very limited computer processes can be applied to these characters other than representing each of these writing characters as a special graphic entities. For that reason, all industrial standards for binary bit patterns employed for representing textual contents for data handling and transmitting systems are derived from a linguistic system which is alphabetic-based, e.g., ASCII code based on English alphabets. Technical difficulties still exist by many previous efforts in attempt to overcome this limitation. Application of the ideographic-based languages, e.g., Chinese, as a programming language for computer or to develop a standard code of binary bit-patterns applicable for broad spectrum of data handling and transmission operations still seem to be entirely impractical. In contrast to the limited number of alphabetic elements used in English for text representation, Chinese language includes about 8000 to 20,000 writing characters depending on the level of writing sophistication. Besides the requirements involves in recognizing and managing this large number of individual writing characters, each of these typographic symbols is further composed by arrangements of stroke elements of different degree of graphic and structure complexities. While the highly sophisticate human brain can manage the complex task of applying these writing characters in developing culture and civilization with ancient traditions, modern computers, with the limited processing power and learning abilities, and without more complicate two-dimensional graphic recognition capability, become completely overwhelmed and incapable to effectively adapt to an ideographic based language such as Chinese which is more graphic in nature.

Considering the fact that languages, e.g., Chinese, Japanese, and Korean, based on different typographic character writings are spoken and written by large proportion of world population today, this language limitation of modern computers and various data handling and transmission systems often imposes a language handicap to these peoples who are not well versed in English. It is not only desirable that this limitation can be overcome such that the application of computer technology can be employed more directly by non-English speaking peoples. But also that higher speed of progress and advancement in technology can be expected when more people have the opportunity to operate and program various processors without being limited by linguistic ability in English.

A machine adapted for selection of complete typographic characters by multiple key operation is disclosed in a U.S. Pat. No. 2,950,800 by Caldwell entitled "Ideographic Type Composition Machine" (issued on Aug. 30, 1960). In order to provide an easy to use type composing machine for Chinese and other similar ideographic languages, Caldwell discloses a useful feature to reduce the number of input keys to represent a character. A typographic character is managed as an "ensemble" and each "ensemble" is analyzed into a plurality of "symbols" wherein each "symbol" are either the elemental strokes or frequently used combinations of elemental strokes with each combination referred to as an "entity". The selections of input keys are performed based on the fact that the writing of an ensemble is accomplished by marking the assembly symbols in a particular recognized sequence. Caldwell discloses a 31-symbol-key machine to provide key selection to compose the writing of an "ensemble", i.e., a Chinese character. Caldwell further discloses a coding means operated in association with the keys for representing each symbol by a binary code. The number of digits used to express a stroke or special instruction is dependent on the frequency of its use.

The invention of Caldwell presents some useful concepts. However, since the invention is focused on the construction of a key board for a type-machine, it does not provide a linguistic basis, generally referred to as a platform, upon which a Chinese computer system can be built. Many key construction elements are incomplete that a computer system or data handling and transmission system can be formed with operations controlled and directed by machine codes derived entirely and directly from Chinese program languages or commands.

In another U.S. Pat. No. 4,689,743, entitled "Method and Apparatus for Validating the Electronic Encoding of an Character" (issued on Aug. 25, 1987), Chiu discloses a method and apparatus for validating the electronic encoding of an incoming ideographic character. The ideographic characters are encoded according to a group of predetermined basic stroke elements and sequencing rules of strokes. The incoming characters are first analyzed by the use of a complexity analyzer to determine the level of complexity for each character. A table lookup search is then performed to match the code of the incoming characters with a list of standard table listing a plurality of characters and corresponding codes. A closest match is then determined to generate as an output for representing the validated incoming character. Chiu's invention could be useful to increase the accuracy and efficiency of construction of characters represented by codes. However, the disclosure does not teach a platform to build a data handling and management system based on binary codes derived from the ideographic characters of a linguistic system.

Yan discloses in another U.S. Pat. No. 4,951,202 entitled "Oriental Language Processing System", a processing system where the Chinese, Japanese, or Korean characters are converted into readable code suitable for input through a small keyboard into an information processor. The ideographic characters are coded into a pronunciation portion and a determinative portion. The codes can be inputted from the keyboard to generated the output wherein the output generated by the processing system are conventional ideographic characters. Yan's disclosure represents another type of attempts in representing or encoding the characters by the use of pronunciations in addition to shapes. However, due to the fact that the pronunciations of characters are less intuitive and involve another layer of associations, Yan's method does not seem to provide any useful technique in developing a non-English computer programming system.

Therefore, a need still exists in the art of design and manufacture of data handling and transmission systems to provide a new platform upon which an ideographic linguistic system can be implemented as a high level language to build operating systems and programs for data and instruction communication. This platform is preferably intuitive and user friendly, and also can be easily adaptable to establish linkage and association to interface with the current English-based systems.

SUMMARY OF THE PRESENT INVENTION

It is therefore an object of the present invention to provide a new method and apparatus to enable a data handling and transmission system to receive and processing textual data based on ideographic characters without being limited by the complexities and graphic structure of these characters such that the aforementioned difficulties and limitations encountered in the prior art can be overcome.

Specifically, it is an object of the present invention to provide a new method and apparatus for decomposing and organizing the ideographic characters in systematic, well defined sequential order such that each character can be processed as a recognizable and ordered entity whereby the processes for handling and transmitting bit patterns based on ideographic characters are managed in a similar manner as that for an alphabetic based language.

Another object of the present invention is to provide a new method and apparatus for decomposing and organizing the ideographic characters in systematic, well defined sequential order such that each character with its recognizable pre-arranged order can be applied directly as a programming language whereby a computer system based directly on a language with ideographic writing characters can be built.

Another object of the present invention is to provide a method and apparatus for decomposing and organizing the ideographic characters in systematic, well defined sequential order such that various data handling and transmission operations for direct applications to languages with ideographic writings can be developed without several layers of conversion and translation between an English based programs and an ideographic language.

Briefly, in a preferred embodiment, the present invention discloses a method for constructing a machine readable binary code for each of a plurality of ideographic characters adaptable for processes by a data handling and transfer system. The method includes the steps of: (a) defining a plurality of binary bit patterns each representing a standard stroke for composing the plurality of ideographic characters; (b) decomposing each of the plurality of ideographic characters into a sequence of compositional strokes each correspondent to one of the standard strokes according to a stroke sequential order for writing the plurality of ideographic characters; and (c) constructing the machine readable binary code adaptable for processes by the data handling and transfer system by sequentially placing each of the binary bit patterns correspondent to each of the compositional strokes according to the stroke sequential order for writing the plurality of ideographic characters whereby each of the ideographic characters are arranged in a systematic predefined order when represented by the machine readable binary code.

These and other objects and advantages of the present invention will no doubt become obvious to those of ordinary skill in the art after having read the following detailed description of the preferred embodiment which is illustrated in the various drawing figures.

BRIEF DESCRIPTION OF THE DRAWINGS

FIG. 1 shows a table including a list of standard strokes for writing Chinese characters and the name, the meaning, pronunciation, and bit pattern for each of these standard strokes;

FIG. 2 is a table listing the standard strokes, the organization, and a rhymed poem representing a story for these standard strokes;

FIG. 3 illustrates a program in English language and in a corresponding Chinese language with the binary code representing the Chinese program;

FIG. 7 is an example of partial listing from a Chinese yellow page sorted in the stroke sequence order according to the present invention;

DETAILED DESCRIPTION OF THE PREFERRED EMBODIMENT

Figure 4:
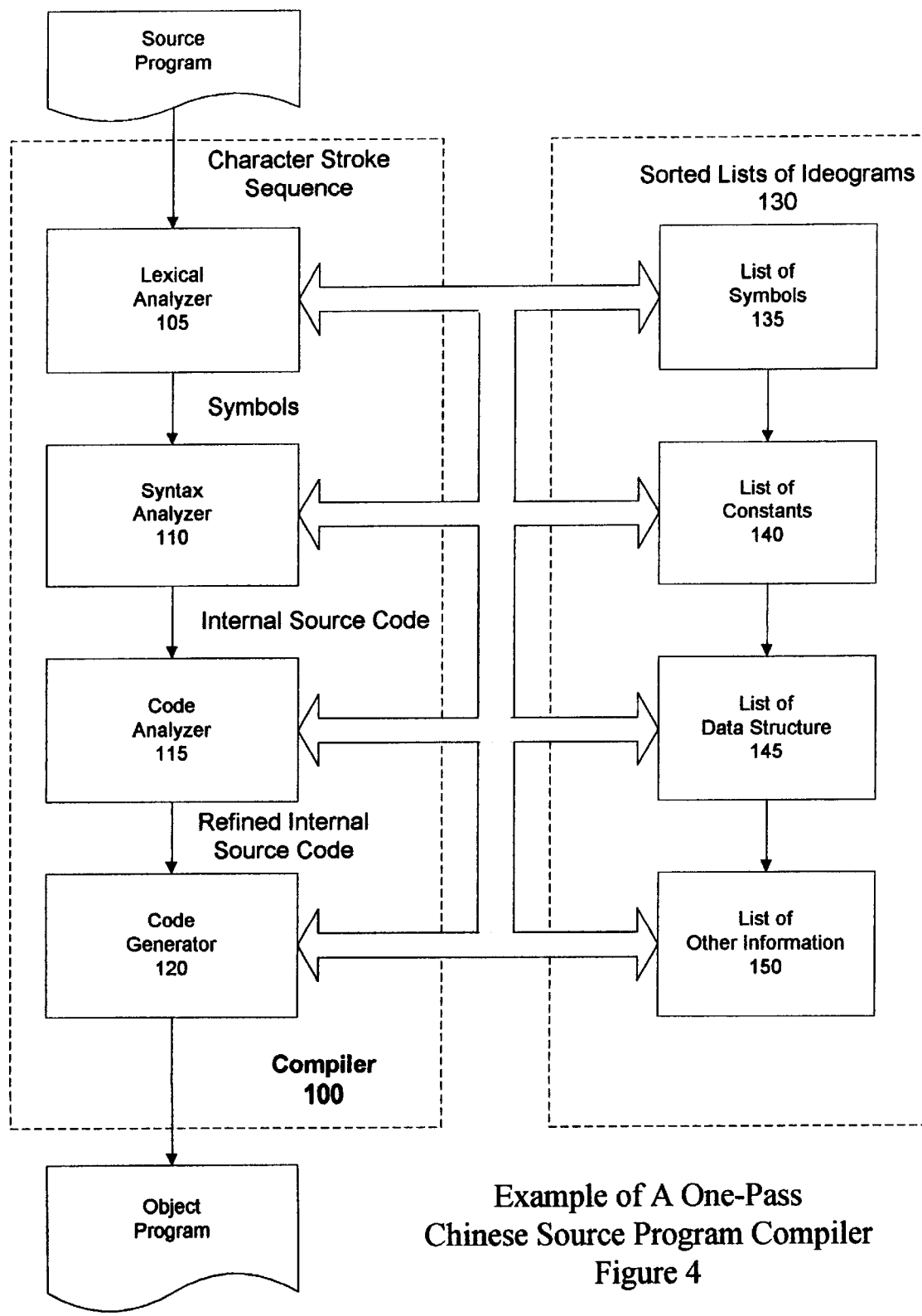
FIG. 4 is a functional block diagram showing the structure and functions performed by a Chinese compiler in processing a Chinese program of FIG. 3.

FIG. 1 is a table which includes six columns. The first column lists a plurality of standard strokes for writing Chinese characters. In the second column, a writing direction for each standard stroke listed in column 1 is indicated. In columns 3, 4 and 5, a name, a pronunciation and the meaning for the name given to the stroke are listed respectively. Corresponding to each standard stroke is a standard bit pattern representing the standard stroke which is listed in column 6. The bit pattern designated for each standard stroke listed in Table 1 is abbreviated by employing a hexadecimal ASCII assignment. For the purpose of practical usefulness and convenience, the Chinese name for each of these standard strokes is especially selected such that the meaning of the name is related to the shape of the corresponding stroke and furthermore, the names of these strokes when read continuously become a rhymed poem so that the standard strokes and their sequence can be easily committed to memory.

In addition to the rhymed syllables in continuously reading the names of these standard strokes, the poem so composed describes a story which is listed in FIG. 2 in a four-column format wherein the first and second columns lists the stroke and the Chinese poem respectively, the third column lists the pronunciation in reading these names, while the fourth column lists the story described by these Chinese names. The story presents a mental picture associated with the rhymed poem to aid a user of the decomposed stroke system in remembering the shapes and sequence together with the meaning of these standard strokes. It should also be noted that the strokes are specially organized according to the shape and writing direction of each stroke. In first row, the first four strokes are horizontal type, in the second row, the next four strokes are vertical type, in the third row, the next four stokes are right-bending type, in the fourth row, the next strokes are left-bending type. The last six strokes are organized into two rows wherein the fifth row are strokes of vertical hook type and the sixth row are strokes of tilted hook type. The organization of these strokes into different shape types also aids a user of this system to create a mental picture such that the effort in memorizing the sequence of these strokes is further simplified.

Based on these standard strokes, each Chinese character can be decomposed into a sequence of standard strokes according to the writing order of each of these standard strokes in composing the character. By the use of these standard strokes and the writing sequence, each Chinese character can therefore be decomposed and then organized into a sequence with a predefined order which can then be converted into a binary bit-pattern according to the sequence of codes for each standard stroke arranged in its writing sequence.

As each Chinese character is now represented by a binary code and also all the Chinese characters are systematically organized into a well defined order according to the binary code, Chinese characters can be applied as a programming language. An example of such application is shown in FIG. 3 wherein a simple summing program originally written in an English computer language, shown in FIG. 3A, is translated into a Chinese program as shown in FIG. 3B. In FIG. 3C, each Chinese character employed for Chinese programming is decomposed according to the standard strokes listed in Table 1 of FIG. 1 and the writing sequence of each character. The program written in Chinese characters with the corresponding binary codes which are also listed as hexadecimal numerals representing this Chinese program can be easily inputted to a computer to be further processed.

One of the major contributions made by this invention is to provide an organized framework upon which a stream of Chinese characters can be placed in a sequential order according to the bit patterns generated from the stroke sequence for each character. And the sorted sequence is conformed with common sense and basic intuition because the characters that started with similar stroke sequences will be grouped together. This organization framework in providing a system for sequentially ordering the ideographic characters enables a broad spectrum of applications involving ideographic-based data handling and network communication. An immediate application is to compile a source program such as the summing program written in Chinese as shown in FIG. 3B. FIG. 4 is functional block diagram showing a sequence of processing steps for illustrating the functional flow of the operations performed by a three-pass Chinese compiler in compiling an ideographic-based source program. The binary bit patterns representing an executable program written in Chinese high level language (HLL) is received as the source program by a compiler 100. The compiler 100 includes a lexical analyzer 105 to convert the source code into symbols. The symbols are then processed by a syntax analyzer 110 to convert into an internal source code which is further processed by a code analyzer 115 to convert into a refined internal source code for inputting to a code generator 120 to generate the object program. In carrying out these tasks during the process of compilation, the compiler 100 interfaces with a compiler data structure 130 which includes lists of symbols 135, list of constants 140, lists of data structures 145, lists of related information data 150, etc. The data structure 130 serves as a compiler designated database for supporting the specifically assigned compilation operation. The fact that the ideographic characters are now sequentially ordered based on the techniques disclosed in this invention enables the use of lists of symbols to perform the lexical and syntax analyses to produce the internal source code.

The present invention thus discloses a method for constructing a machine readable binary code for each of a plurality of ideographic characters adaptable for processes by a data handling and transfer system. The method includes the steps of: (a) defining a plurality of binary bit patterns each representing a standard stroke for composing the plurality of ideographic characters; (b) decomposing each of the plurality of ideographic characters into a sequence of compositional strokes each correspondent to one of the standard strokes according to a stroke sequential order for writing the plurality of ideographic characters; and (c) constructing the machine readable binary code adaptable for processes by the data handling and transfer system by sequentially placing each of the binary bit patterns correspondent to each of the compositional strokes according to the stroke sequential order for writing the plurality of ideographic characters whereby each of the ideographic characters are arranged in a systematic predefined order when represented by the machine readable binary code.

Figure 5:
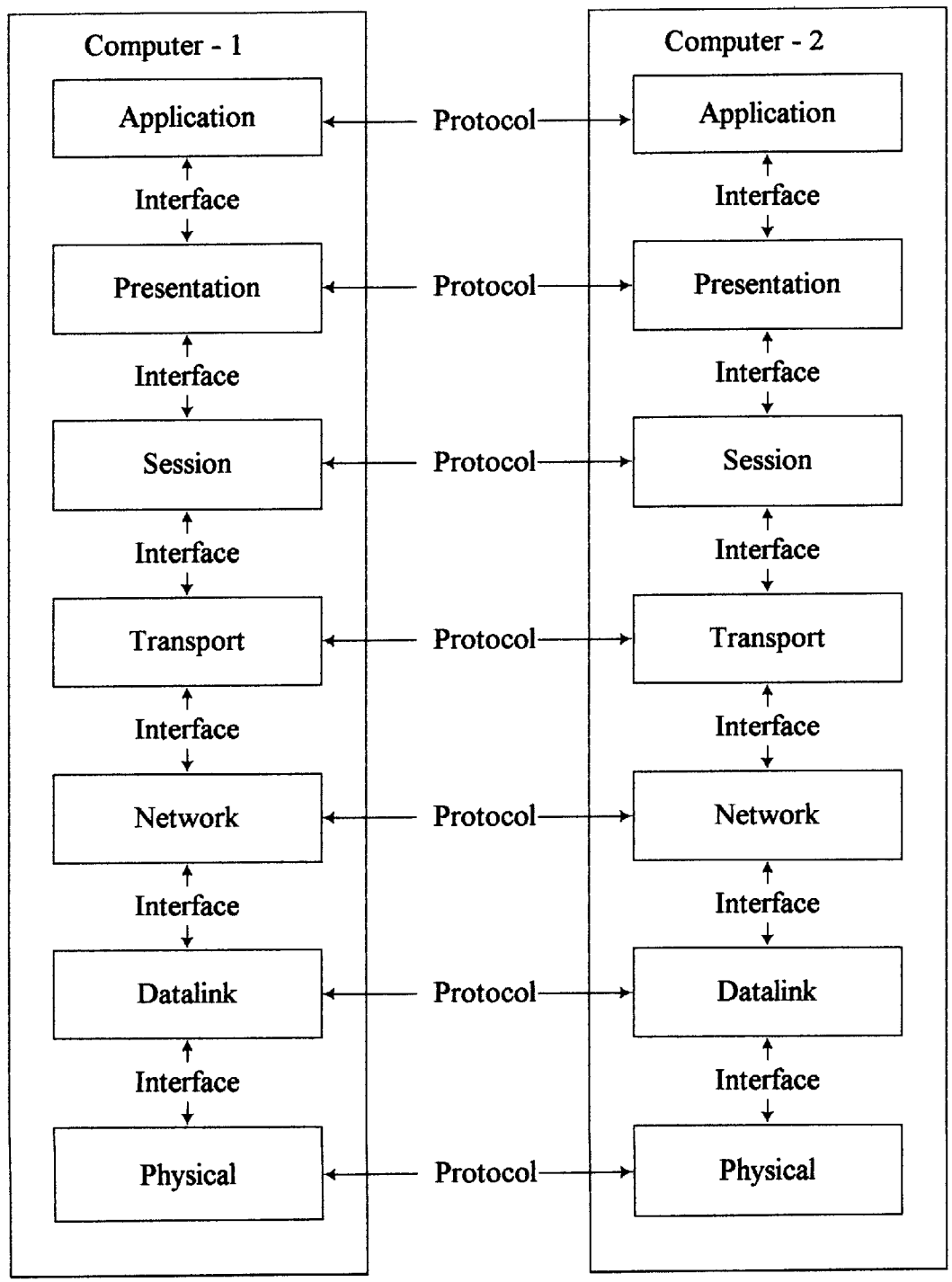
FIG. 5 is a functional block diagram of a networked data handling and transmission system for illustrating the processes performed by the system in handling data transmission by communicating in Chinese.

FIG. 5 shows a system block diagram for two of the networked computers. It is well known in the art that communications between networked computers are carried in several "layers", e.g., in a standard communication model OSI (Open System Interface) there are seven layers of communications which are physical, data-link, network, transport, session, presentation, and application layers. Interchange of protocols are first carried out to establish links for transmission of packets of messages. Each packet may include headers and message data. All the protocols, and message packets are organized in sequentially ordered binary bits to be processed by both computers. Since the languages with ideographic characters which are now decomposed and organized in bit patterns with predefined sequential order, the characters of these languages can be employed as basis for communication. Binary bits to define the exchange of protocols represented by Chinese characters can be performed between networked computers since the characters are now specifically defined in well organized bit patterns with predefined sequential order. Exchange of messages and data can also be carried based on the characters of an ideographic language when the characters are decomposed and organized for representation by the use of binary bits which are sequentially ordered. More importantly, a major contribution of this invention is to allow network destination names to be managed in a sorted routing table.

Figure 6:
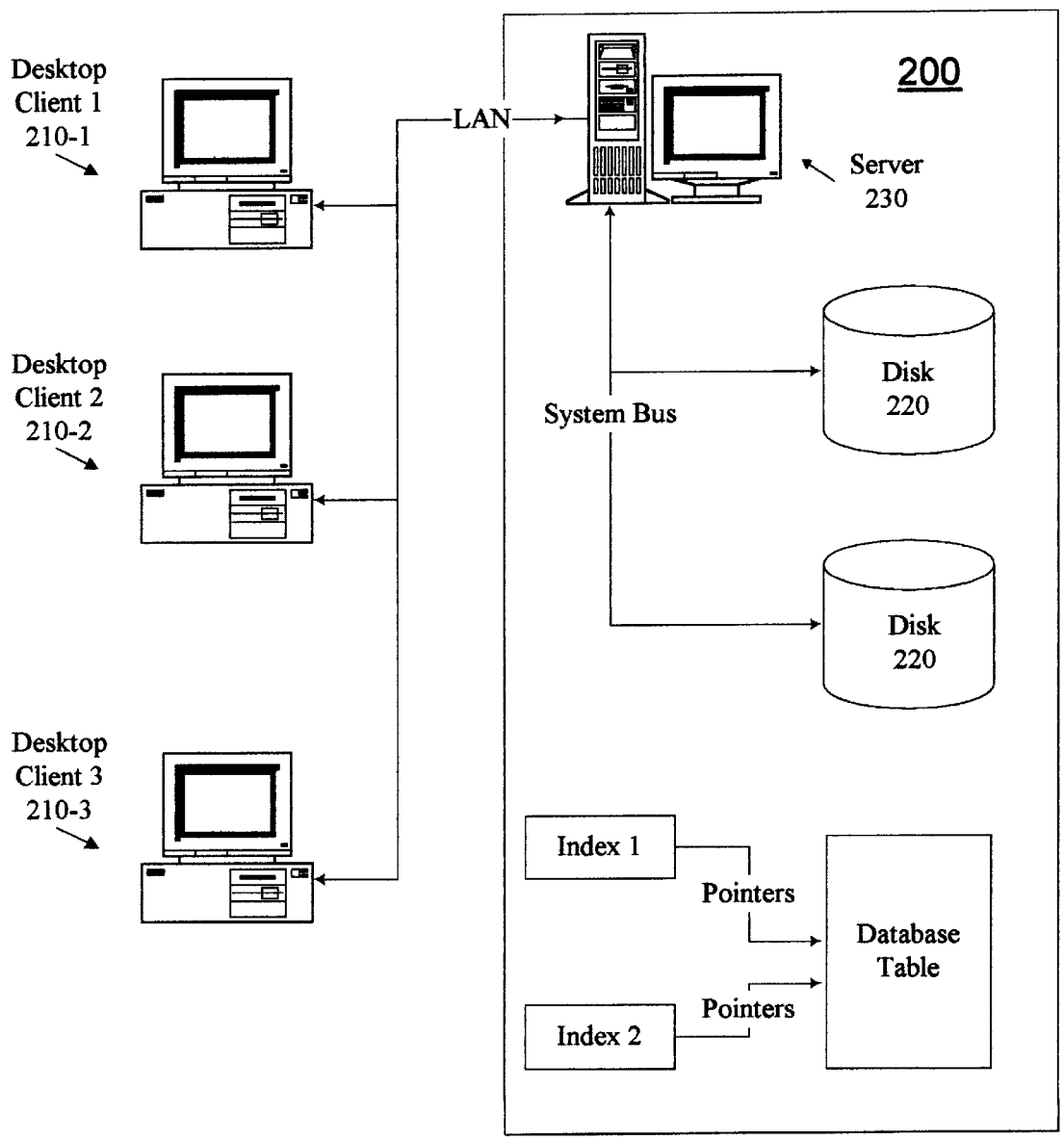
FIG. 6 is a functional block diagram of a database management system for illustrating the structure and functions performed by the database management system in processing a Chinese database.

FIG. 6 is a functional block diagram for a networked data-handling system 200 wherein a plurality of clients 210-1, 210-2, . . . , 210-n are connected to a database 220 via a server 230. Each client may have different data search or retrieval requirements. The database 220 may include data stored in several disks 240 with each data item assigned with a specific unique address indicating the storage location. For effective management of the database, an index system is generally provided for convenience of search. With each Chinese ideogram now decomposed and assigned with well organized sequential code, a database management system can be developed taking advantage of the sequential order of these ideogram to construct various index tables. These index tables can be applied to systematically and conveniently identify the location of each Chinese ideogram based on the binary representation which are now assigned with a sequential order in the database. All the techniques useful for database management can now be applied, in a parallel manner, to database containing Chinese ideograms.

FIG. 7 shows a partial list of entries for a Chinese listing of a sequence of Internet Web-Sites which are sorted according to the sequential order based on the binary bits for the decomposed strokes according to the writing sequence. The "Web-site" entries when recorded in a computer database can be easily indexed. Because the Chinese characters can be systematically arranged in sequential order, a regular yellow page book, or any listing of categorized subjects, e.g., a Chinese listing of "Web-sites" on the Internet System, can be conveniently compiled into "digitized yellow-page book" arranged according to the sequence based on the code sequence obtained from the decomposed stroke order as described above. The digitized yellow-page book can be easily searched either by the use of a personal computer locally on a compact disk or an internal database or via an on-line search through the Internet connections.

Figure 8:
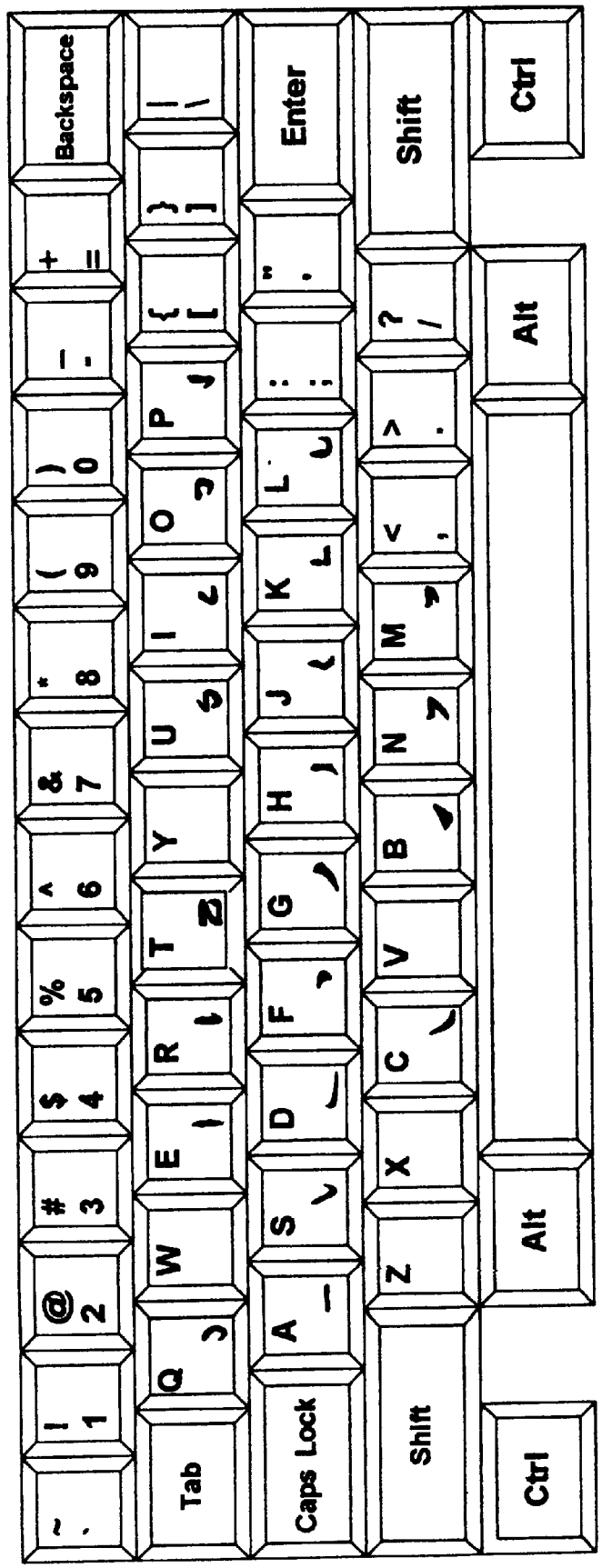
FIG. 8 shows a keyboard includes a plurality of key-pads wherein each key-pad is provided for typing a standard decomposed stroke for composing a Chinese character.
Figure 9:
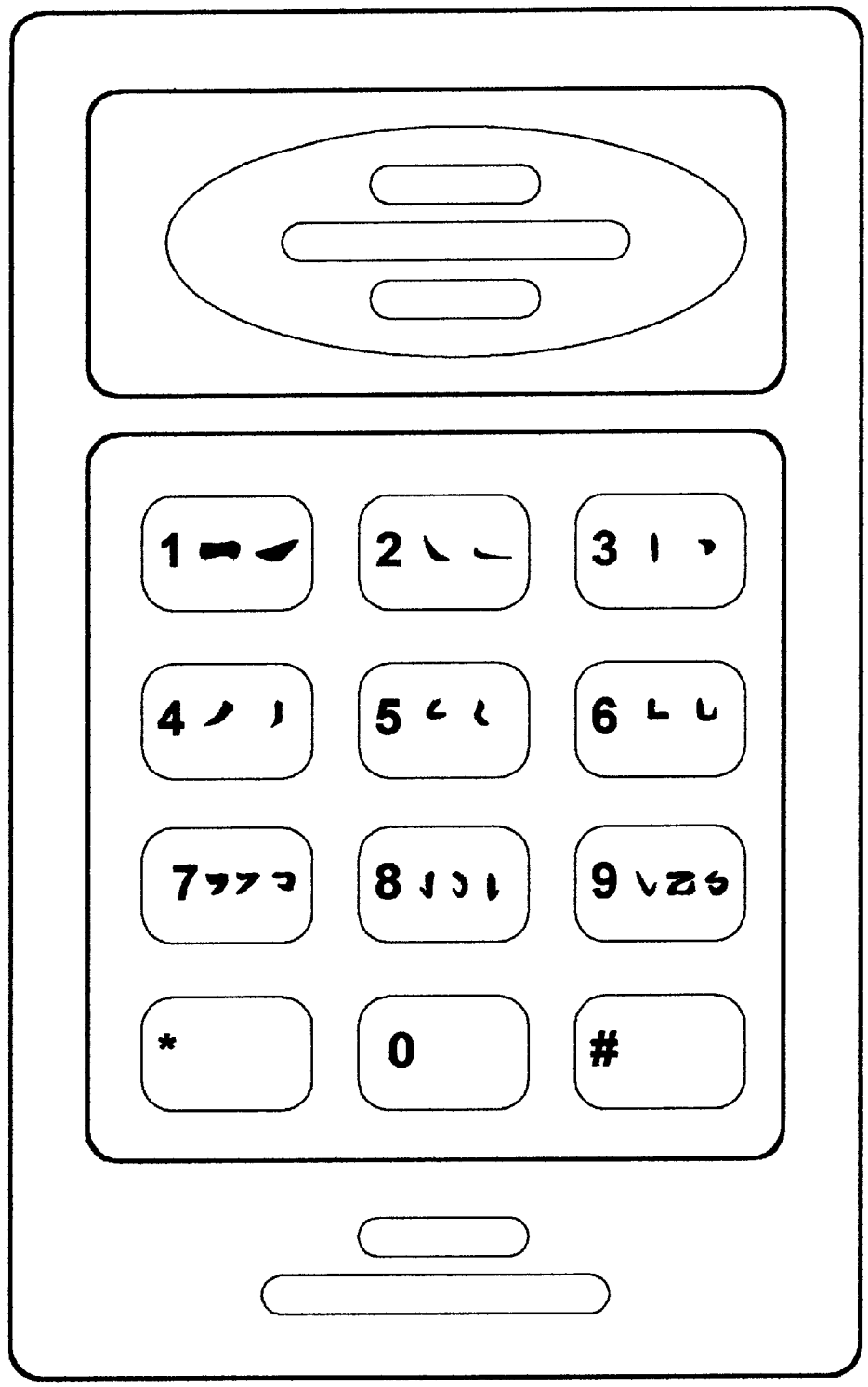
FIG. 9 shows a dial-pad board for a telephone which includes a plurality of dial pads with each pad marked with several standard decomposed strokes for composing Chinese characters.

As the ideographic characters are now decomposable into ordered stroke sequence as disclosed in this invention, each of the standard strokes as that listed in Table 1 can be managed as an alphabet. With the ideographic characters now "alphabetized", the English keyboard can be easily converted to a Chinese keyboard as that shown in FIG. 8. The stroke assigned to each key pad is one possible arrangement among many different configurations depending on the frequency of appearances of each strokes and possible correlation of arrangement of keys with respect to ease of use and speed of typing when different of key arrangement are tested. Similarly, as that shown in FIG. 9, a dial pad arrangement can also be made with each dial key of a telephone assigned with several standard strokes similar to alphabetic assignment for dial key assignment in English. For ease of remembering, phone number may just be represented by a Chinese word where the number corresponding the sequence of dialing key according to the writing sequence of the standard strokes marked on the dial pads.

Figure 10:
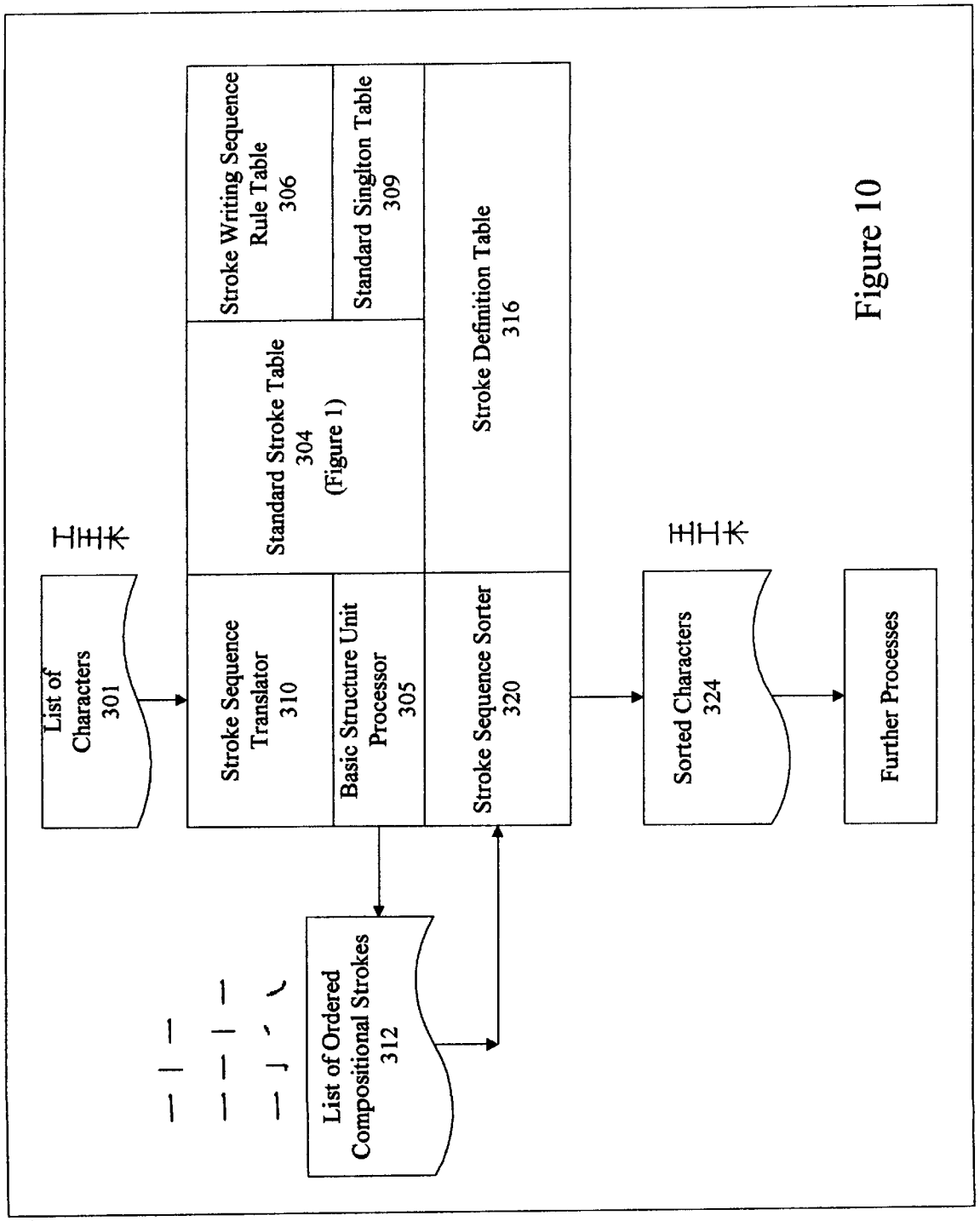
FIG. 10 is a functional block diagram showing a character processing system and data flow employed to sort a list of ideographic characters.
Figure 11:
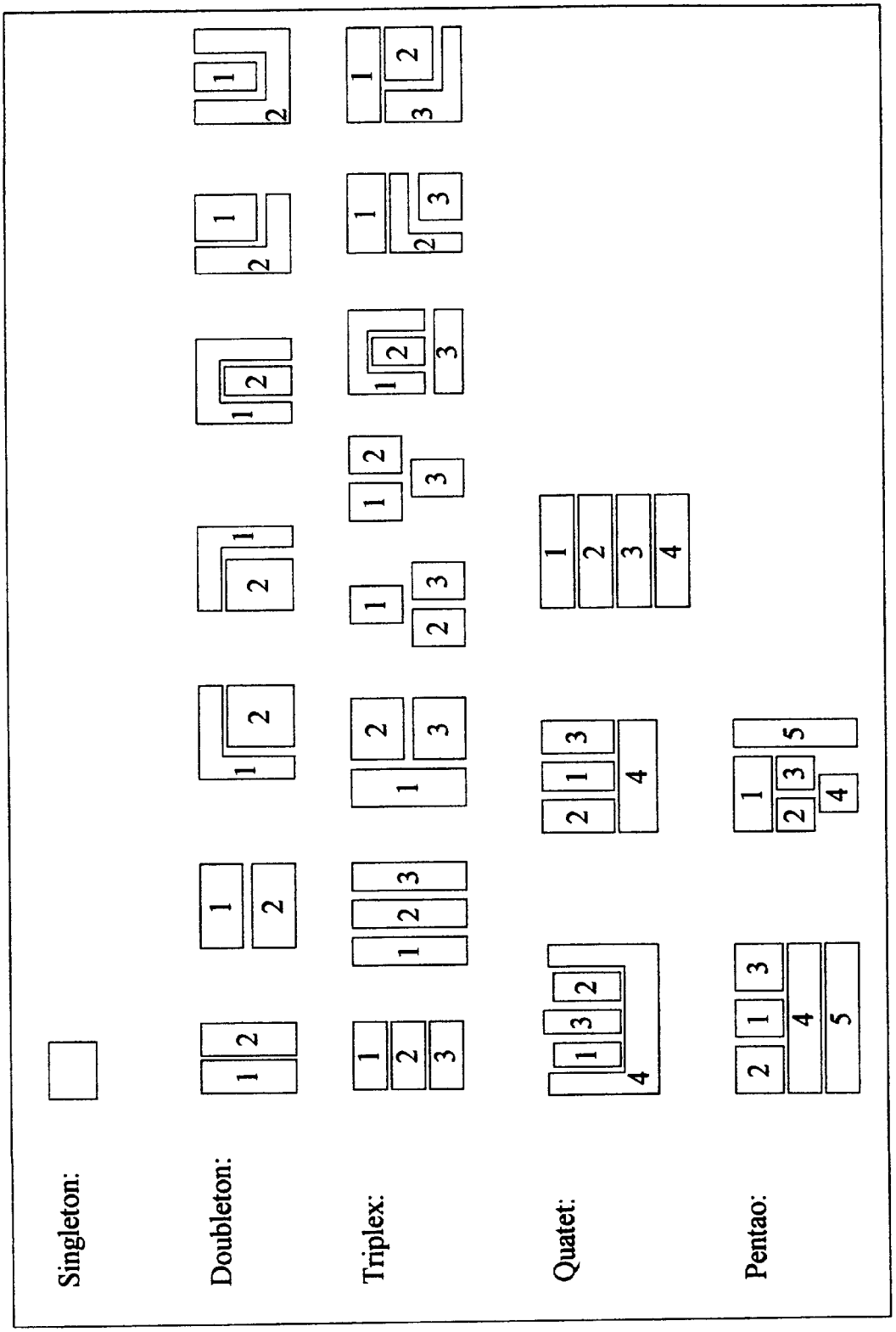
FIG. 11 is a set of standard rules for combining several basic structural units of the Chinese characters.
Figure 12:
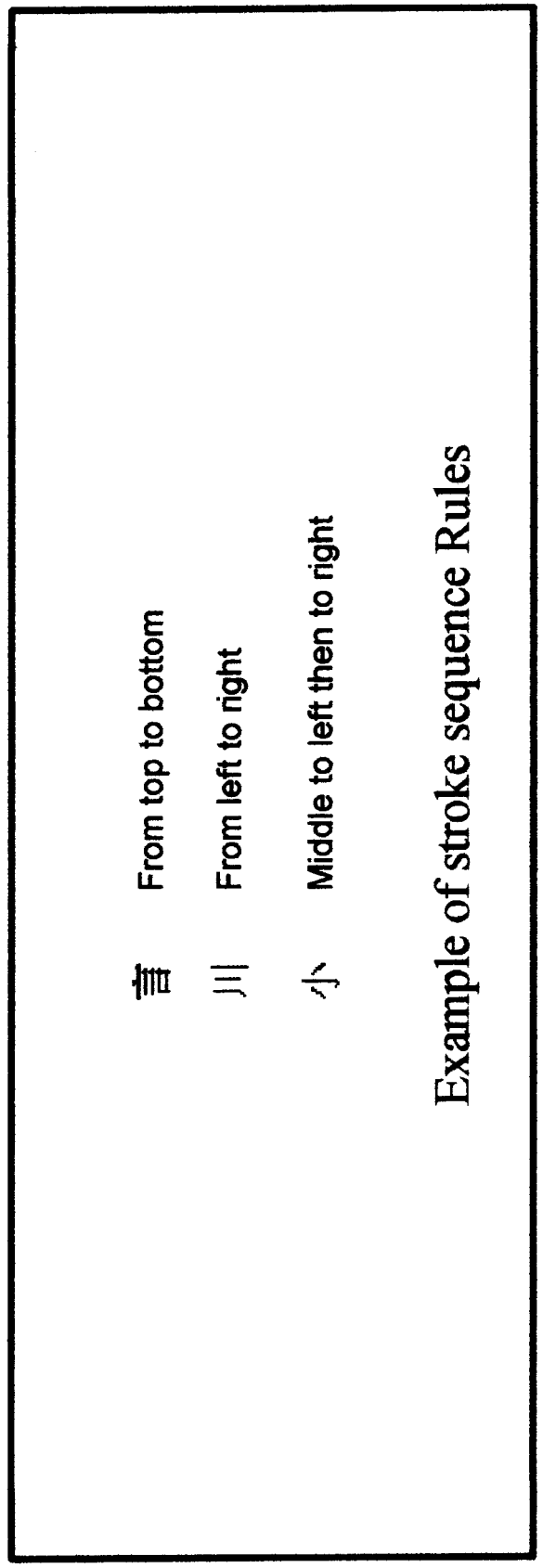
FIG. 12 is a set of rules for determining the writing sequence of the singletons and the standard strokes of the Chinese characters.

FIG. 10 shows a system 300 for processing and sorting a plurality of ideographic characters. The character sorting system 300 includes a stroke sequence translator 310 to receive a list of characters 301. The stroke sequence translator 310 also includes a standard stroke table 304 which includes a set of standard strokes as that shown in FIG. 1, and a set of stroke writing sequence rules 306 ( an example of such a set of writing sequence rules is provided in FIG. 12 which will be described below ). The stroke sequence translator 310 further includes a basic structural unit processing means 305 to decompose each character into a plurality of singletons, i.e., a set of basic structural units, according to a set of basic structural rules 309 as that shown in FIG. 11. An optical recognition is made by the character basic structural unit processing means 305 to determine the number of basic units of an ideographic character. An example of a set of basic structural units of Chinese characters and a list of exemplary basic structural units, i.e., singletons, are shown in FIG. 11. According to the structure rules, a Chinese character may be a singleton (one basic unit), duplex (two basic units), triplex (three units), quartet (four units), pentad (five units), and hexed (six units). A Chinese character can be a combination of several basic units, i.e., a singleton. After the basic unit structure rule is applied to determine the number of basic units, a second set of rules as provided in FIG. 12 is applied to determine the writing sequence for each of these basic units. The basic rule of determining the writing sequence of the basic units for composing the entire character and the rule for determining a stroke writing sequence within each basic unit are, in most cases identical. These rules are provided in FIG. 12 which typically follows the principles of either "from-top-to-bottom" or "from-left-to-right" or "middle-to-left-then-to-right". Applying these basic writing sequence rules to determine 1) the number of basic units of each character, 2) the writing sequence of these basic units, and 3) the stroke writing sequence within each basic unit, the stroke sequence translator 310 is able to generate the list of compositional strokes 312 to be further processed by the stroke sequence sorter 320.

Therefore, the standard strokes as listed in the standard stroke table 304 and the stroke writing sequence rule 306 can be applied to process the list of characters 301 determine a list of compositional strokes 312 for each character. A data file which includes the list of compositional strokes 312 is then outputted from the stroke sequence translator 310 to a stroke sequence sorter 320 which includes a stroke definition table 316 provided with a numerical code for each standard strokes. The stroke sequence sorter 320 then applies the stroke definition table 316 to the data file containing a list of compositional strokes 312 to determine a list of numerical character codes. These numerical character code is then used by the sequence sorter 320 to generate a sorted list of characters 324 according the order of the numerical character codes.

Figure 13:
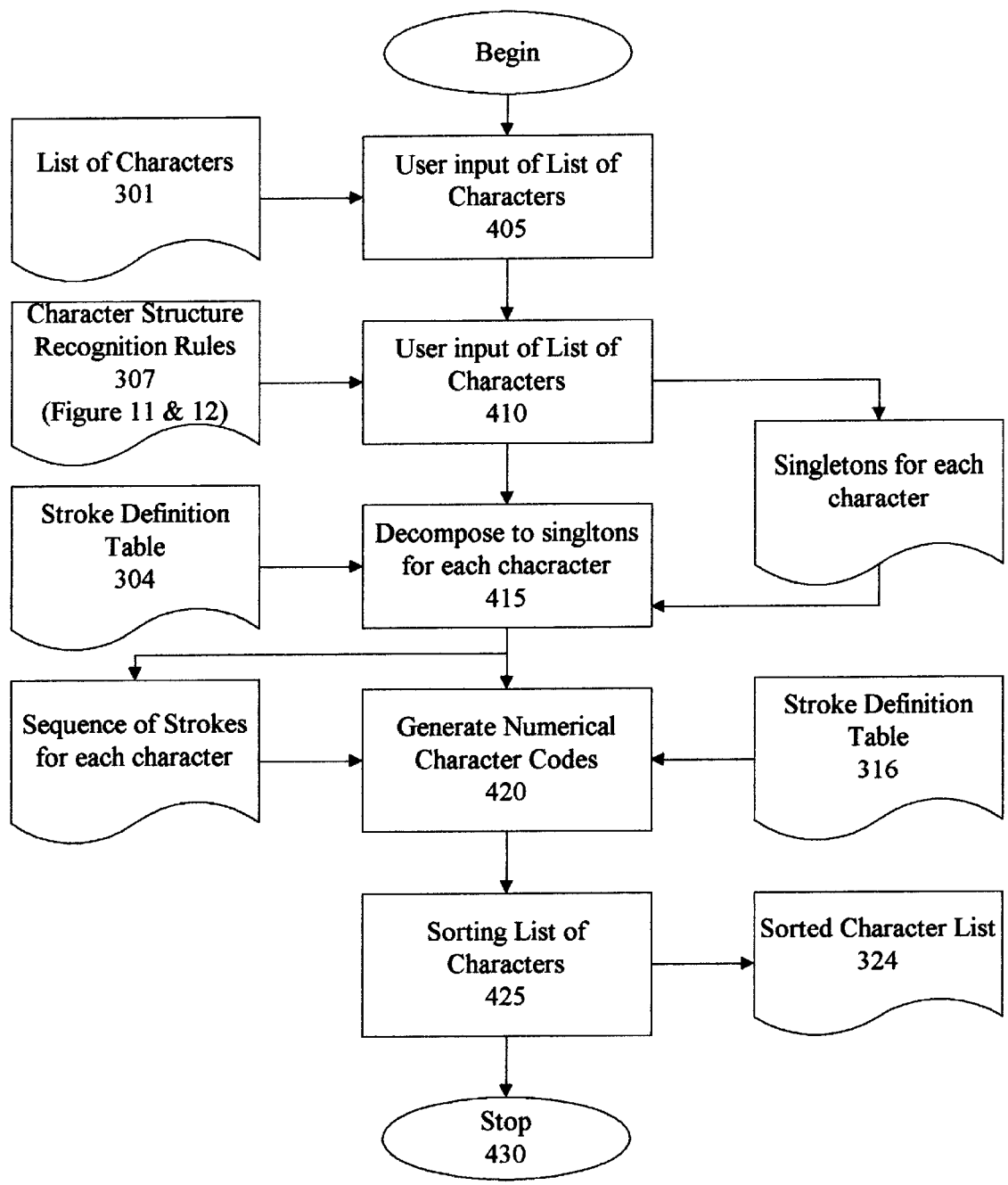
FIG. 13 is a flow chart showing the processing steps performed by the character encoder and sorter to sort a n order of a list characters according the decomposed stroke sequence of these characters.

FIG. 13 is a flow chart showing a sequence of steps to sort a list of characters 301. The sorting process begins (step 400) with the receipt of user's input of a list of characters 301 by a stroke sequence translator 310 (step 405). The basic structural unit processing means 305 then performs a character structure recognition process (step 410) by applying a set of character structure recognition rules 307 (according to FIGS. 11 and 12) to reduce each character of the character list 301 to a sequence of singletons 309. The stroke sequence translator 310 then employs the standard stroke table 304 and the stroke writing sequence rule 306 to decompose a series of sequenced basic structural units, i.e., the sequence of singletons 309, to a set of corresponding compositional strokes 312 (step 415). The stroke sequence sorter 320 then applies a stroke definition table 316 to generate a numerical character code for each character (step 420) and performs a sorting process based on the numerical character code (step 425) to generate a list of sorted characters 324.

Thus, an ideographic-based character processor 300 is taught by this invention. The character processor 300 is provided for receiving a plurality of ideographic characters 301 for sorting out a sequential order for arranging the characters. The character processor 300 includes a character encoding means 310 for determining a numerical character-code for each character based on a combination of standard stroke codes according to a writing sequence of standard strokes in composing each character. The processor further includes a sorting means 320 for sorting out the sequential order for arranging the characters by employing the numerical character-code determined by the encoding means for each of the characters. In a preferred embodiment, the encoding means further includes a stroke sequence translator 310 having a standard stroke table 304 and a stroke writing sequence rule table 306 for determining a list of ordered compositional strokes 312 for each of the characters. The encoding means further includes a stroke definition table 316 for providing a numerical code for each of the ordered compositional strokes whereby the encoding means is provided to combine the numerical codes for the ordered compositional strokes into the numerical character codes for each character.

This invention discloses a method for processing a plurality of ideographic characters 301 to sort out a sequential order for arranging the characters. The method includes the steps of (a) storing a standard stroke table 304 including a plurality of standard strokes and a plurality of stroke numerical codes each corresponding to one of the standard strokes in a character encoding means 310 for encoding the plurality of characters 301; (b)storing a stroke writing sequence rule table 306 including a plurality of rules in the character encoding means 310 for determining a writing sequence for composing each of the characters by sequentially writing the standard strokes; (c) employing the character encoding means 310 with the standard stroke table 304 and the stroke writing sequence rule table 306 for decomposing each of the characters 301 into a plurality of compositional strokes based on the standard stroke table 304 and determining a list of ordered compositional stokes for each of the characters based on the writing sequence rule table 306; (c) employing the character encoding means 310 with the standard stroke table 304 having a numerical stroke code for each of the standard strokes for determining a numerical character-code for each character 301 based on a combination of the stroke numerical codes according to a writing sequence of the compositional strokes for each of the characters; and (d) a sorting means 324 for sorting out the sequential order for arranging the characters by employing the numerical character-code determined by the encoding means 310 for each of the characters. In a preferred embodiment, the method further includes a step of (e) processing a plurality of the ideographic characters including a list of Internet addresses; (f) arranging the Internet addresses in a database table according to a sequential order of the characters defining the Internet addresses; and (g) storing the database table including the Internet addresses in an Internet system; (h)receiving a user input of plurality of ideogrphic characters defining user Internet addresses and processing the user input into a plurality of user input numerical character codes; and (i) comparing and matching the user input numerical character codes with the database table including the Internet addresses for establishing network communication. In another preferred embodiment, the step of processing a plurality of the ideographic characters including a list of Internet addresses further including a step of processing the ideographic characters including Web-site addresses.

Figure 14:
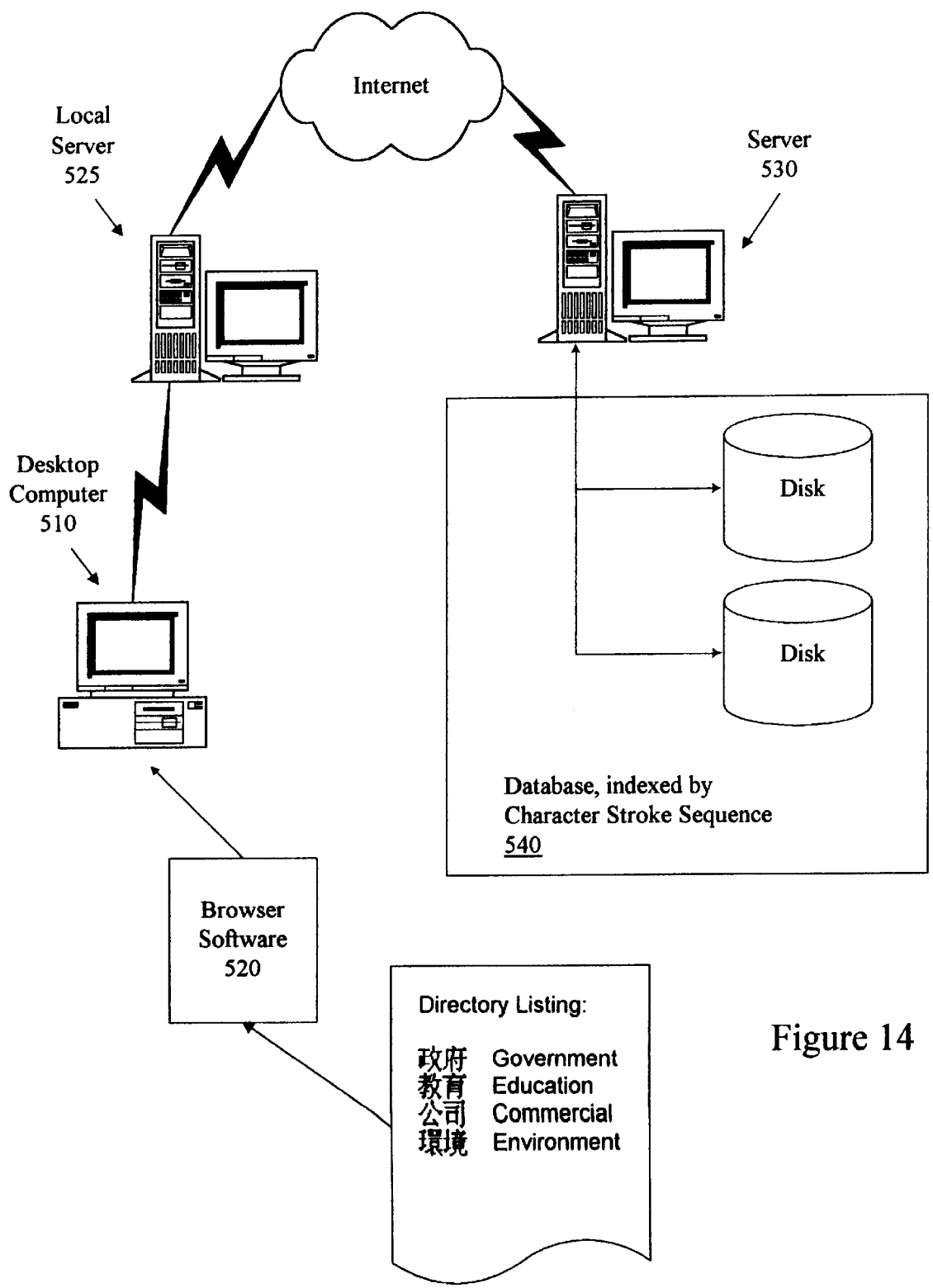
FIG. 14 shows a Chinese database sorted and categorized according to conventions ready for on-line Internet search.

As the ideographical characters can be sorted and numerically indexed, a "browser", "search engine" or other software tools utilized in a networked system as that shown in FIG. 14 can be applied. One example of such software tool is a Chinese browser 520 residing in a computer 510 operated in a networked system 500 connected through an Internet network 505. The browser 520 is connected through a local server 525 to the Internet network 505 which includes a plurality of network directory servers 530. Each server 530 include an indexed ideographic database 540, e.g., database containing Chinese characters. As shown in FIG. 14, the Chinese database may include sub-databases linked by indexed user-names, user-groups, server names, Internet addresses, etc., and the sub-databases may include different categories such based on Chinese characters corresponding to categories such as government, educational institutes, commercial, environmental, etc. This kind of categories based on Chinese characters is feasible because the characters are now coded with sequential numerical representation which can be conveniently sorted according the apparatus and methods taught in this invention.

Therefore, the present invention provides a new method and apparatus to enable a data handling and transmission system to receive and processing textual-data based on ideographic characters without being limited by the complexities and graphic structure of these characters such that the difficulties and limitations encountered in the prior art can be overcome. Specifically, a new method and apparatus for decomposing and organizing the ideographic characters in systematic, well defined sequential order such that each character can be processed as a recognizable and ordered entity whereby the processes for handling and transmitting bit patterns based on ideographic characters are managed in a similar manner as that for an alphabetic based language. Furthermore, each ideographic character with its recognizable prearranged order can be applied directly as a programming language whereby a computer system based directly on a language with ideographic writing characters, e.g., the Chinese characters, can be built. Additionally, with the method and apparatus of this invention, the ideographic characters can be decomposed and organized in systematic, well defined sequential order such that various data handling and transmission operations can be implemented with languages with ideographic writings without several layers of conversion and translation between an English based programs and an ideographic language.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A method for processing a plurality of ideographic characters to sort out a sequential order for arranging said characters comprising:

provided a plurality of standard strokes and naming each of said plurality of standard strokes with a specific alphabetic-pronunciation associated with a shape and a customary sound of each of said standard strokes whereby each of said standard strokes is processed as a named-and-pronounced ideographic-alphabet;

arranging said plurality of standard strokes in a standard order relating to a poem in reading said alphabetic-pronunciation of each of said standard stroke according to said standard order for providing humanly comprehensible order based on said named-and-pronounced ideographic-alphabet;

storing a standard stroke table including said plurality of standard strokes and a plurality of stroke numerical codes according to said standard order, each of said numerical codes corresponding to one of said standard strokes in a character encoding means for encoding said plurality of characters;

storing a stroke writing sequence rule table including a plurality of rules in said character encoding means for determining a writing sequence for composing each of said characters by sequentially writing said standard strokes;

employing said character encoding means with said standard stroke table and said stroke writing sequence rule table for decomposing each of said characters into a plurality of compositional strokes based on said standard stroke table and determining a list of ordered compositional stokes for each of said characters based on said writing sequence rule table;

employing said character encoding means with said standard stroke table having a numerical stroke code for each of said standard strokes for determining a numerical character-code for each character based on a combination of said stroke numerical codes according to a writing sequence of said compositional strokes for each of said characters; and providing a sorting means for sorting out said sequential order for arranging said characters by employing said numerical character-code determined by said encoding means for each of said characters.

2. The method for processing and sorting said ideographic characters of claim 1 further comprising:

processing a plurality of said ideographic characters including a list of Internet addresses;

arranging said Internet addresses in a database table according to a sequential order of said characters defining said Internet addresses wherein said database table is arranged with a humanly comprehensible order based on said named-and-pronounced ideographic-alphabet;

storing said database table including said Internet addresses in an Internet system;

receiving a user input of plurality of ideographic characters defining user Internet addresses and processing said user input into a plurality of user input numerical character codes; and comparing and matching said user input numerical character codes with database table including said Internet addresses for establishing network communication.

3. The method for processing and sorting said ideographic characters of claim 2 wherein:

said step of processing a plurality of said ideographic characters including a list of Internet addresses further including processing said ideographic characters including Web-site addresses arranged in said database table arranged with a humanly comprehensible order based on said named-and-pronounced ideographic-alphabet.

4. A method for constructing a machine readable binary code for each of a plurality of ideographic characters adaptable for processes by a data handling and transfer system, said method comprising steps of:

(a) providing a set of standard strokes, said set consisted of approximately twenty to thirty standard strokes;

(b) defining a plurality of binary bit patterns each pattern consisted of eight bits corresponding to one of an eight-bit ASCII compatible codes representing one of said standard strokes;

(c) decomposing each of said plurality of ideographic characters into a sequence of compositional strokes each correspondent to one of said standard strokes according to a stroke sequential order for writing said plurality of ideographic characters; and (e) constructing said machine readable binary code adaptable for processes by said data handling and transfer system by sequentially placing each of said binary bit patterns correspondent to each of said compositional strokes according to said stroke sequential order for writing said plurality of ideographic characters whereby each of said ideographic characters are arranged in a systematic predefined order when represented by said machine readable binary code and provided for running a database management operation by applying a database management program employed for handling data items represented by said ASCII compatible codes.

5. A method arranging a plurality of ideographic characters in a sequential order comprising steps of:

(a) defining a plurality of stroke codes each representing a standard stroke and naming each of said plurality of standard strokes with a specific alphabetic-pronunciation associated with a shape and a customary sound of each of said standard strokes whereby each of said standard strokes is processed as a named-and-pronounced ideographic-alphabet;

(b) decomposing each of said plurality of ideographic characters into a sequence of compositional strokes each corresponding to one of said standard strokes according to a standard stroke writing sequence for writing said plurality of ideographic characters; and (c) combining said standard stroke codes according to said standard stroke writing sequence for each of said characters to determine a plurality of numerical character codes and sorting said numerical character codes thus providing a sequential order for each of said characters arranged with a humanly comprehensible order based on said named-and-pronounced ideographic-alphabet.

6. The method of arranging said ideographic characters in a sequential order of claim 5, wherein said step (a) of defining a plurality of stroke codes each representing a standard stroke further including a step of:

(a1) (b) arranging said plurality of standard strokes in a standard order relating to a poem in reading said alphabetic-pronunciation of each of said standard stroke according to said standard order for providing to form a stroke-alphabetical table with humanly comprehensible order based on said named-and-pronounced ideographic-alphabet.

7. The method of arranging said ideographic characters in a sequential order of claim 6, wherein said step (a1) of arranging said standard strokes in a standard order is a step of:

(a2) arranging said standard strokes in a standard order relating to a subject matter by reciting said named-and-pronounced ideographic-alphabet for each of said standard strokes for convenience in remembering said standard order.

8. The method of arranging said ideographic characters in a sequential order of claim 7, wherein said step (a2) in arranging said standard strokes in a standard order relating to a subject matter for convenience in remembering said standard order is a step of:

(a3) arranging said standard strokes in a standard order relating to a story by reciting said named-and-pronounced ideographic-alphabet for each of said standard strokes for convenience in remembering said standard order.

9. The method of arranging said ideographic characters in a sequential order of claim 7, wherein said step (a2) in arranging said standard strokes in a standard order relating to a subject matter for convenience in remembering said standard order is a step of:

(a4) arranging said standard strokes in a standard order relating to a poem by reciting said named-and-pronounced ideographic-alphabet for each of said standard strokes for convenience in remembering said standard order.

10. An ideographic-based data handling system comprising:

a data handling means having an ideographic alphabet table for storing plurality of codified named-and-pronounced ideographic alphabets for recognizing and sequentially sorting a plurality of ideographic characters by employing a set of sequentially ordered character codes based on a set of standard stroke codes for a set of standard strokes each represented by one of said named-and-pronounced ideographic-alphabets and for decomposing said plurality of ideographic characters according to a writing sequence of each ideographic character with said set of named-and-pronounced ideographic-alphabets.

11. The ideographic-based data handling system of claim 10:

said data handling means includes a compiler provided for compiling a source program written in said ideographic characters each being recognized as an ordered stream of said named-and-pronounced ideographic-alphabets according to a writing sequence for each ideographic character.

12. The ideographic-based data handling system of claim 11:

said compiler further includes a means for performing lexical and syntax analyses by employing a sequential order of said sequentially ordered character codes representing said ideographic characters composed with said named-and-pronounced ideographic-alphabets in writing said source program.

13. The ideographic-based data handling system of claim 10 further comprising:

at least another networked ideographic-based data handling system provided for performing exchange of data therein-between by recognizing and processing said sequentially ordered character codes representing said ideographic characters composed with said named-and-pronounced ideographic-alphabets.

14. The ideographic-based data handling system of claim 10 further comprising:

means for data-base management provided for managing a database by recognizing and processing said sequentially ordered character codes representing said ideographic characters composed with said named-and-pronounced ideographic-alphabets.

15. The ideographic-based data handling system of claim 10 further comprising:

a database containing a plurality of ideographic-based data items wherein said data items arranged according to an order based on said sequentially ordered character codes representing said ideographic characters each coded based on a writing sequence with said set of said named-and-pronounced ideographic-alphabets for composing said ideographic characters.

16. The ideographic-based data handling system of claim 10 further comprising:

a keyboard including a plurality of key pads for entering data, wherein each of said named-and-pronounced ideographic-alphabets is provided for entering into said data handling system by one of said key pads for composing said ideographic characters.

17. The ideographic-based data handling system of claim 10 further comprising:

a dial-pad including a plurality of dialing keys for entering a dialing sequence, wherein said named-and-pronounced ideographic-alphabets are marked on said dial-pad for associated dialing keys whereby said dialing sequence of said dialing keys may be conveniently associated with special ideographic characters by composing said named-and-pronounced ideographic-alphabets according to said dial sequence.

18. A means for processing a plurality of ideographic characters to sort out a sequential order for arranging said characters comprising:

a character encoding means includes an ideographic alphabet table for storing a plurality of codified named-and-pronounced ideographic alphabets for determining a numerical character-code for each character based on a combination of standard stroke codes according to a writing sequence of standard strokes each represented by one of said codified as named-and-pronounced ideographic alphabets in composing each character; and a sorting means for sorting out said sequential order for arranging said characters by employing said numerical character-code determined by said encoding means for each of said characters.

19. The means for processing and sorting said ideographic characters of claim 18 wherein:

said encoding means further includes a stroke sequence translator having a stroke writing sequence rule table for determining a list of ordered compositional strokes each represented by one of said codified as named-and-pronounced ideographic alphabets for each of said characters; and said ideographic alphabet table further includes a alphabet numerical table for providing a numerical code for each of said named-and-pronounced ideographic alphabets whereby said encoding means is provided to combine said numerical codes for said ordered named-and-pronounced ideographic alphabets into said numerical character codes for each character.

* * * * *